Patented Sept. 20, 1932

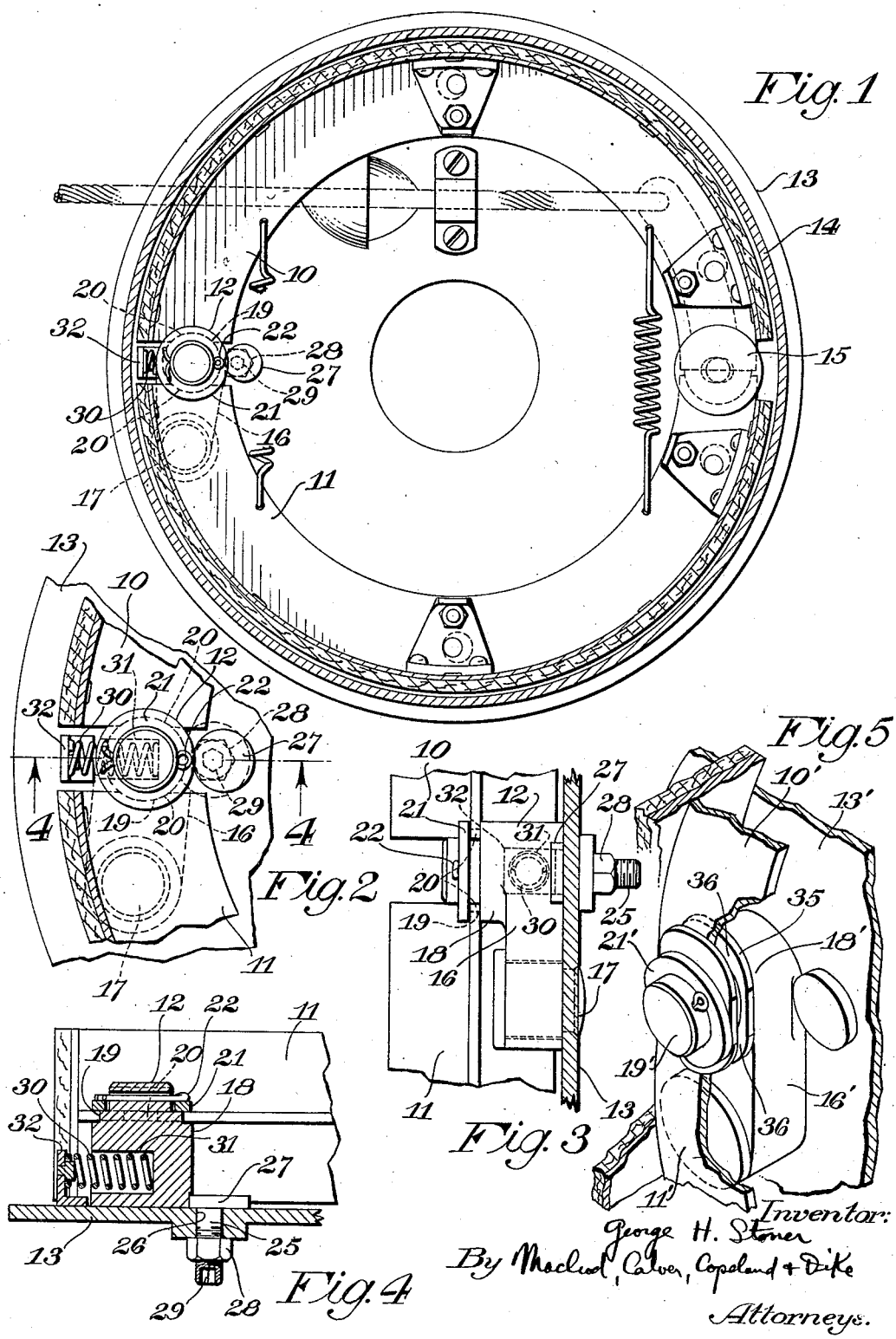

1,878,912

UNITED STATES PATENT OFFICE

GEORGE H. STONER, OF BOSTON, MASSACHUSETTS, ASSIGNOR TO STONER-AMES BRAKE COMPANY, INC., OF BOSTON, MASSACHUSETTS, A CORPORATION OF MASSACHUSETTS

BRAKE ANCHOR

Application filed April 4, 1931. Serial No. 527,733.

This invention relates to vehicle brakes of the internal expansion type and more particularly to devices for anchoring the brake shoes upon the stationary backing plate.

It is an object of the present invention to provide an anchoring device of simple construction which will operate efficiently.

It is a further object of the invention to provide an anchoring device which is arranged so that it may be conveniently and readily adjusted upon the backing plate.

Before explaining in detail the present invention, it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not of limitation, and it is not intended to limit the invention beyond the terms of the claim hereto appended as considered in view of the prior art and the requirements thereof.

The invention will be more clearly understood from the following description in conjunction with the accompanying drawing: in which, Fig. 1 is a sectional elevational view of a vehicle brake embodying the invention;

Fig. 2 is an enlarged detail elevational view of a portion of the brake;

Fig. 3 is a sectional elevational view as viewed from the right of Fig. 2;

Fig. 4 is a sectional view taken upon the line 4—4, Fig. 2; and

Fig. 5 is a detail perspective view of a portion of a brake embodying a modified form of the invention.

One embodiment of the invention is illustrated in Figs. 1 to 4 in the accompanying drawing as applied to a vehicle brake having brake shoes 10 and 11 mounted upon an anchor 12 carried by a fixed backing plate 13 so as to be moved into and out of engagement with a brake drum 14 by a suitable expanding device, generally indicated at 15. The anchor 12 comprises an arm 16 pivotally mounted at one end upon a stud 17 suitably fixed in the backing plate 13. A boss 18 is formed on the arm 16 near its free end and is provided with a reduced bearing portion 19 of substantially cylindrical form. One end of each of the shoes 10 and 11 is provided with a cylindrical shaped depression 20 adapted to engage the bearing 19. The ends of the shoes 10 and 11 engage the bearing 19 between the boss 18 and a washer 21 held upon the bearing 19 as by a cotter pin 22. Preferably, the angle between lines connecting the center of the bearing 19 with the center of the drum 14 and with the center of the stud 17 should not be less than 90° when the shoes 10 and 11 are in engagement with the drum.

A shaft 25 is mounted in a suitable bearing 26 formed in the backing plate 13 and carries at one end an eccentric 27 adapted to engage the arm 16. The outer end of the shaft 25 is threaded to receive a nut 28 adapted to hold the face of the eccentric 27 in engagement with the surface of the backing plate. A slot 29 also is provided in the outer end of the shaft 25 to receive a suitable tool for turning the shaft to adjust the position of the eccentric. The arm 16 normally is held in engagement with the eccentric 27 by a spring 30 one end of which is received in a socket 31 in the arm 16 and the other end of which engages a shelf 32 projecting from and secured upon the backing plate 13.

When the expanding device 15 is actuated to spread the shoes 10 and 11, the arm 16 is moved about the stud 17 to move the lower end of both shoes in engagement with the drum 14. It will be noted that with this construction, the force created by the tendency of one shoe to move with the rotating drum is transmitted to the other shoe tending to hold the latter in engagement with the drum. When the brake shoes have become worn so as to require adjustment, the nut 28 is loosened and the eccentric 27 turned to move the free end of the arm 16 toward the brake drum a desired amount. The eccentric 27 is locked in adjusted position by tightening the nut 28.

In the modified construction illustrated in Fig. 5 an equalizer plate 35 is pivotally mounted upon the bearing 19' between the boss 18' and the washer 21'. The ends of the equalizer plate 35 are provided with bearing slots 36 for pivotally carrying the ends of the brake shoes 10' and 11'. The purpose of the equalizer plate is to compensate for any inequality in the adjustment of the shoes 10' and 11'.

I claim:

In a vehicle brake, in combination, a rotatable brake drum, a stationary backing plate, an arm pivotally mounted at one end on the backing plate, and a pair of brake shoes pivotally carried at the other end of said arm, the angle formed by the center line of said arm and a line passing from the center of the drum to the end of the arm carrying said shoes being not less than 90° when the shoes are in engagement with the drum.

In testimony whereof I affix my signature.

GEORGE H. STONER.